May 13, 1930.  A. HESS  1,758,040
PIPE HANGER
Filed June 16, 1926

INVENTOR.
Arthur Hess
BY Nestall and Nallace
ATTORNEYS.

Patented May 13, 1930

1,758,040

UNITED STATES PATENT OFFICE

ARTHUR HESS, OF LOS ANGELES, CALIFORNIA, ASSIGNOR OF ONE-HALF TO SAMUEL L. MARSH, OF LOS ANGELES, CALIFORNIA

PIPE HANGER

Application filed June 16, 1926. Serial No. 116,328.

This invention relates to a fitting for supporting pipe and like cylindrical objects and is especially adapted to support pipes from a ceiling. In order to level pipes, the supports therefor should be adjustable whereby they may be raised and lowered limited distances.

The present invention has for its primary object the provision of a hanger which may be readily secured above a pipe and which may then be adjusted as to height. Another object of this invention is the provision of a split pipe embracing member which may be locked in closed position by means of an adjustment member. In addition to the broader objects of this invention there are certain details of structure, whereby a simple, economical, and durable pipe hanger is obtained.

Figure 1:
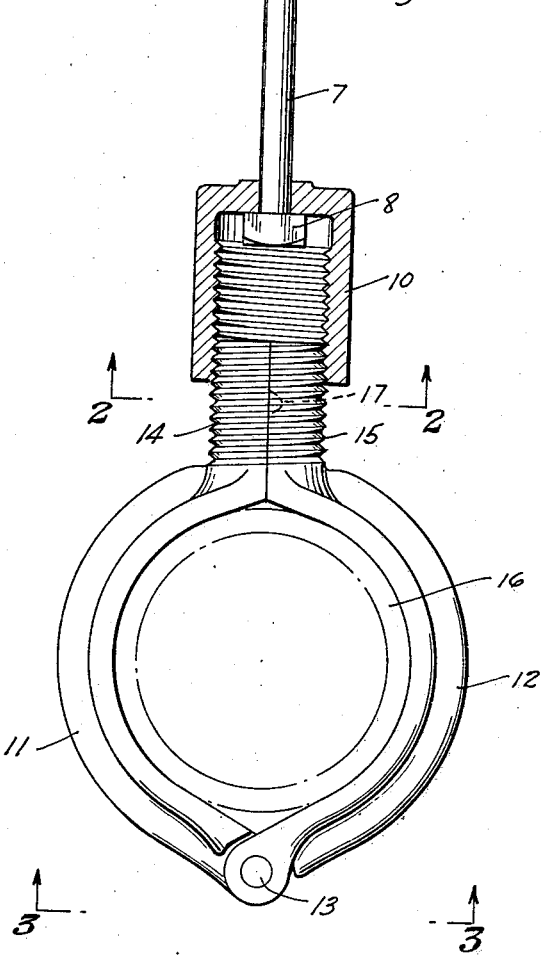
Figure 2:
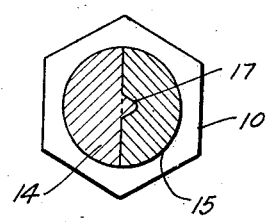
Figure 3:
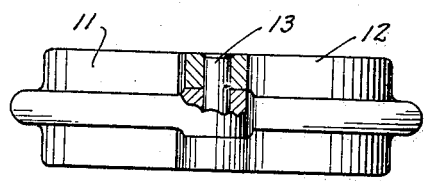

These objects together with other objects and corresponding accomplishments are obtained by means of the embodiment of my invention illustrated in the accompanying drawing, in which:

Fig. 1 is an elevation partly in section of a hanger secured to a ceiling and supporting a pipe; Fig. 2 is a section as seen on the line 2—2 of Fig. 1; Fig. 3 is a bottom plan view looking in the direction of the arrows 3—3 of Fig. 1.

Referring with more particularity to the drawing, 5 indicates a cement ceiling in which are embedded inserts 6. The ceiling is provided with a number of aligned inserts to support hangers. These inserts are of channel form and form no part of the present invention. They serve to support bolts which form parts of the hangers.

The hanger comprises a bolt 7 having a head 8 and is conveniently provided with a nut 9 whereby the bolt may be secured to the insert. Although I have shown a bolt, any equivalent element having a shank and an enlargement may be used. A sleeve or thimble 10 has an aperture in its head to receive the shank 7 of the bolt. The thimble is internally threaded to receive the split shank of the pipe embracing member. The latter comprises semi-annular members 11 and 12 hinged together by a pin 13 which passes through eyes in the members. The other ends of the members when closed form a cylindrical shank which is externally threaded to correspond to the threads in thimble 10.

The hanger is installed by placing the bolt in its insert with the thimble hanging therefrom and resting upon the head of the bolt. The annular pipe embracing member is opened and passed around the pipe 16. The sections 14 and 15 of the shank being brought together are inserted in the bore of the thimble. To insure alignment of the threads of the shank when the pipe embracing member is closed, a cooperating stud and recess are provided. On the abutting face of shank member 14 is a stud 17 arranged to rest in a corresponding recess in shank member 15. This assures alignment of the members. The thimble is now turned to engage its threads with those upon the shank. This locks the pipe embracing member in closed position. By turning the thimble in a suitable direction, the pipe embracing member may be raised or lowered as desired. This is effective in leveling the pipe, adjustment being obtained by turning the thimble.

What I claim is:

1. A pipe hanger comprising a rod for connection to an overhead support, a thimble rotatably mounted upon said rod and depending therefrom, the bore of said thimble being threaded, and a split pipe embracing member having sections forming a threaded shank for engagement in said bore, there being a stud and cooperating recess on said sections for alignment thereof.

2. A pipe hanger comprising a bolt for connection to an overhead support, a thimble swivelled upon the shank of said bolt, depending therefrom and resting upon the head of said bolt so as to be freely rotatable axially thereof, the bore of said thimble being threaded, and a split pipe embracing member having sections forming a threaded shank for engagement in said bore to hold said sections together and to longitudinally adjust the position of said shank.

3. A pipe hanger comprising a rod for connection to an overhead support, a thimble swivelled upon said rod and extending therefrom so as to be freely rotatable axially thereof, the bore of said thimble being threaded, and a pipe embracing member having sections hinged together at one end and extended portions at the other end forming when closed a threaded shank to hold said sections together and to longitudinally adjust the position of said shank.

4. A pipe hanger comprising a rod for connection to an overhead support, a thimble swivelled upon said rod and extending therefrom so as to be freely rotatable axially thereof, the bore of said thimble being threaded, and a pipe embracing member having sections hinged together at one end and extended portions at the other end forming when closed a threaded shank, there being a stud and cooperating recess on said sections for alignment thereof to hold said portions together and to longitudinally adjust the position of said shank.

5. A pipe hanger comprising a bolt for connection to an overhead support, a thimble rotatably mounted upon the shank of said bolt, depending therefrom and resting upon the head thereof, the bore of said thimble being threaded, and a split ring having its sections hinged together at one end and provided with cooperating extensions at the other end and forming when closed a threaded shank for engagement with said bore to hold said extensions together and to longitudinally adjust the position of said shank.

In witness that I claim the foregoing I have hereunto subscribed my name this 7th day of June, 1926.

ARTHUR HESS.